United States Patent [19]
Eisen et al.

[11] Patent Number: 5,527,602
[45] Date of Patent: Jun. 18, 1996

[54] LAMINATES OF GRAFT POLYMER AND THERMOPLASTIC POLYURETHANE

[75] Inventors: Norbert Eisen, Cologne; Harry Staratschek, Odenthal; Herbert Vogl, Cologne, all of Germany

[73] Assignee: Bayer Aktiengesellschaft, Leverkusen, Germany

[21] Appl. No.: 328,549

[22] Filed: Oct. 25, 1994

Related U.S. Application Data

[63] Continuation of Ser. No. 49,110, Apr. 19, 1993, abandoned.

[30]    Foreign Application Priority Data

Apr. 30, 1992  [DE]  Germany .......................... 42 14 192.3

[51] Int. Cl.⁶ ..................................................... B32B 27/40
[52] U.S. Cl. .................. 428/319.7; 312/401; 428/318.6; 428/319.3; 428/423.1; 428/423.3; 428/424.2; 428/424.7; 428/424.8
[58] Field of Search .............................. 428/318.6, 319.3, 428/319.7, 319.9, 423.1, 423.3, 424.2, 424.7, 424.8; 312/400, 401, 405, 406

[56]    References Cited

U.S. PATENT DOCUMENTS

| 4,332,858 | 6/1982 | Saitoh et al. | 428/412 |
| 4,707,396 | 11/1987 | Wank et al. | 428/216 |
| 5,149,589 | 9/1992 | Naritomi et al. | 428/412 |

FOREIGN PATENT DOCUMENTS

| 0243911 | 11/1987 | European Pat. Off. . |
| 2445223 | 7/1980 | France . |
| 4011741 | 1/1992 | Germany . |

*Primary Examiner*—D. S. Nakarani
*Attorney, Agent, or Firm*—Connolly & Hutz

[57]    ABSTRACT

Composite moldings of at least one layer of an ABS plastic and at least one layer of a thermoplastic polyurethane having a Shore D hardness of >50, a layer of coupling agent optionally being present between the ABS layer and the thermoplastic polyurethane layer.

7 Claims, 1 Drawing Sheet

LAMINATES OF GRAFT POLYMER AND THERMOPLASTIC POLYURETHANE

This is a continuation of U.S. application Ser. No. 08/049,110 filed Apr. 19, 1993, now abandoned.

This invention relates to laminates or composites of at least one layer of an ABS plastic and at least one layer of a thermoplastic polyurethane (TPU) having a Shore D hardness of >50 and preferably 55 to 75, an adhesive layer preferably consisting of a thermoplastic polyurethane (TPU) with a Shore D hardness of <50 and preferably 45 to 30 optionally being present between the ABS layer and the thermoplastic polyurethane layer. The moldings according to the invention are preferably sheet-form laminates which may be in direct contact with polyurethane foams. For example, they may be composite films having the following layer sequence: ABS/TPU or TPU/ABS/TPU or ABS/adhesive promoter/TPU or TPU/coupling agent/ABS/coupling agent/TPU.

By virtue of their TPU outer layer, the composites according to the invention are particularly resistant to chemicals. In particular, they are resistant to partly halogenated and, in particular, partly fluorinated hydrocarbons, more particularly 1,1-dichloro-2,2,2-trifluoroethane and 1,1-dichloro-1-fluoroethane. As sheet-form laminates, the products according to the invention may be formed by thermoforming.

Figure 1:
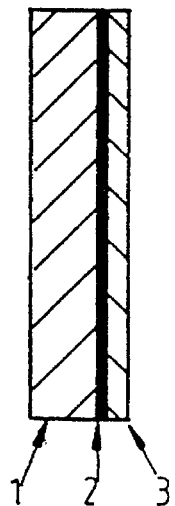
FIG. 1 illustrates the composite material of the invention in sheet form.

In the context of the invention, ABS plastics are, for example, products of the graft polymerization of resin-forming monomers, particularly styrene, acrylonitrile, methyl methacrylate and mixture thereof, onto a rubber, more particularly polybutadiene and butadiene/styrene copolymers and mixtures of the graft products with thermoplastic resins, such as copolymers of styrene and acrylonitrile, copolymers of α-methyl styrene and acrylonitrile and terpolymers of styrene, α-methyl styrene and acrylonitrile. Accordingly, the term ABS plastics not only includes acrylonitrile/butadiene/styrene copolymers in the narrower sense but also methyl methacrylate, α-methyl styrene and other rubbers.

Preferred ABS plastics are two-phase polymers of 1. a thermoplastic copolymer of styrene and acrylonitrile, in which the styrene can be completely or partly replaced by α-methyl styrene or methyl methacrylate; this copolymer, also known as an SAN resin or matrix resin, forms the outer phase;

2. at least one graft polymer which has been produced by graft polymerization of one or more of the monomers mentioned under 1. on a butadiene homopolymer or copolymer ("graft base"). This graft polymer ("elastomer phase" or "graft rubber") forms the disperse phase in the matrix resin.

The polymers mentioned in 1. and 2. may be produced by known methods, such as emulsion, solution, bulk, suspension or precipitation polymerization or even by combinations of such processes.

ABS plastics particularly suitable for extrusion consist of a styrene/acrylonitrile (SAN) copolymer (72% by weight styrene, 28% by weight acrylonitrile) having a molecular weight $\overline{M}_w$ (weight average) of approx. 120,000 for a molecular non-uniformity $$\overline{M}_n/\overline{M}_w - 1 \leq 2$$

as matrix resin ($\overline{M}_n$=number average molecular weight, $\overline{M}_w$=weight average molecular weight) and a graft rubber consisting of 50 parts by weight polybutadiene having an average particle diameter ($d_{50}$) of 0.1 to 0.4 μm, onto which 36 parts by weight styrene and 14 parts by weight acrylonitrile have been graft-polymerized. The mixing ratio of styrene/acrylonitrile copolymer and graft rubber is preferably 40–80:60–20 (based on weight) and, more preferably, 60:40.

Thermoplastic polyurethanes (as the outer layer) may be produced, for example, by reaction of a) organic diisocyanates, b) substantially difunctional polyhydroxyl compounds having molecular weights of 500 to 8000 and, preferably, 1000 to 4000 and c) chain-extending agents having molecular weights of 60 to 400, optionally in the presence of d) catalysts.

Thermoplastic polyurethanes (TPU) such as these are known, for example, from EP-PS 134 55.

Preferred organic diisocyanates a) for the production of the TPU's are, for example, aliphatic, cycloaliphatic and, preferably, aromatic diisocyanates, such as hexamethylene diisocyanate; cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 4,4'-, 2,4'- and 2,2'-dicyclohexyl methane diisocyanate and the corresponding isomer mixtures and, preferably, aromatic diisocyanates, such as 2,4-tolylene diisocyanate, mixtures of 2,4- and 2,6-tolylene diisocyanate, 4,4'-, 2,4'- and 2,2'-diphenyl methane diisocyanate, mixtures of 2,4'- and 4,4'-diphenyl methane diisocyanate, urethane-modified liquid 4,4'- and/or 2,4'-diphenyl methane diisocyanates, 4,4'-diphenylethane- 1,2-diisocyanates and 1,5-naphthylene diisocyanate. 1,6-Hexamethylene diisocyanate, isophorone diisocyanate, diphenyl methane/diisocyanate isomer mixtures containing more than 96% by weight 4,4'-diphenyl methane diisocyanate and, more particularly, 4,4'-diphenyl methane diisocyanate are preferably used.

Preferred relatively high molecular weight polyhydroxyl compounds b) for the production of the TPU's are preferably linear polyether diols and polyester diols or weakly branched polyhydroxyl compounds having a functionality of more than 2 to 3 and other hydroxyfunctional polymers, for example polyacetals, such as water-insoluble formals, for example polybutanediol formal and polyhexanediol formal, and polycarbonates, more particularly those of diphenyl carbonate and hexane-1,6-diol, produced by transesterification and having the molecular weights mentioned above. The polyhydroxyl compounds must be at least predominantly linear, i.e. should have a functionality of at least two in the context of the isocyanate reaction. The polyhydroxyl compounds mentioned may be used as individual components or in the form of mixtures.

Suitable polyether polyols may be obtained by reacting one or more alkylene oxides containing 2 to 4 carbon atoms in the alkylene radical with a starter molecule to which two active hydrogen atoms are attached. Examples of suitable alkylene oxides are ethylene oxide, 1,2-propylene oxide, epichlorohydrin and 1,2- and 2,3-butylene oxide. Ethylene oxide and mixtures of 1,2-propylene oxide and ethylene oxide are preferably used. The alkylene oxides may be used individually, alternately one after the other or in the form of a mixture. Suitable starter molecules are, for example, water, aminoalcohols, such as N-alkyl diethanolamines, for example N-methyl diethanolamine, and diols, such as ethylene glycol, 1,3-propylene glycol, butane-1,4-diol and hexane-1,6-diol. Mixtures of starter molecules may also be used. Other suitable polyether polyols are the hydroxyfunctional polymerization products of tetrahydrofuran.

Polytetramethylene ether diols and polyether diols of 1,2-propylene oxide and ethylene oxide, in which more than 50% and preferably 60 to 80% of the OH groups are primary OH groups and in which the ethylene oxide is at least partly arranged as a terminal block, are preferably used.

Polyether polyols such as these may be obtained, for example, by addition of first the 1,2-propylene oxide and then ethylene oxide onto the starter molecule or by addition of first the 1,2-propylene oxide in admixture with part of the ethylene oxide and then the remaining ethylene oxide onto the starter molecule or by stepwise addition of first part of the ethylene oxide, then all the 1,2-propylene oxide and, finally, the remaining ethylene oxide onto the starter molecule.

The substantially linear polyether polyols have molecular weights of 500 to 8000, preferably 600 to 6000 and, more preferably, 1000 to 40,000. They may be used both individually and in the form of mixtures with one another.

Suitable polyester polyols may be prepared, for example, from dicarboxylic acids containing 2 to 12 carbon atoms, preferably 4 to 6 carbon atoms, and polyhydric alcohols. Suitable dicarboxylic acids are, for example, aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or in the form of mixtures, for example in the form of a mixture of succinic acid, glutaric acid adipic acid. In order to manufacture polyetherpolyols, it may be of advantage to use the corresponding dicarboxylic acid derivatives, such as carboxylic acid diesters containing 1 to 4 carbon atoms in the alcohol radical, carboxylic anhydrides or carboxylic acid chlorides instead of the carboxylic acids. Examples of polyhydric alcohols are glycols containing 2 to 10 and preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols may be used individually or optionally in the form of mixtures with one another.

Also suitable are esters of carbonic acid with the above-mentioned diols, particularly those containing 4 to 6 carbon atoms, such as 1,4-butanediol and/or 1,6-hexanediol, condensation products of ω-hydroxycarboxylic acids, for example ω-hydroxycaproic acid, and, preferably, polyadducts of lactones, for example optionally substituted ε-caprolactones.

Preferred polyester polyols are ethanediol polyadipates, 1,4-butanediol polyadipates, ethanediol/1,4-butanediol polyadipates, 1,6-hexanediol/neopentyl glycol polyadipates, 1,6-hexanediol/1,4-butanediol polyadipates and polycaprolactones.

The polyester polyols have molecular weights of 500 to 6000 and preferably 1000 to 4000.

Preferred chain-extending agents c) for the production of the TPU's A are preferably aliphatic diols containing 2 to 12 carbon atoms, preferably 2, 4 or 6 carbon atoms, such as for example ethanediol, 1,6-hexanediol, diethylene glycol, dipropylene glycol and, in particular, 1,4-butanediol. However, other suitable chain-extending agents are diesters of terephthalic acid with glycols containing 2 to 4 carbon atoms, such as for example terephthalic acid bis-ethylene glycol or 1,4-butanediol, hydroxyalkylene ethers of hydroquinone, such as for example 1,4-di-(β-hydroxyethyl)-hydroquinone, (cyclo) aliphatic diamines, such as for example isophoronediamine, ethylenediamine, 1,2- and 1,3-propylenediamine, N-methyl propylene-1,3-diamine, N,N'-dimethyl ethylenediamine, and aromatic diamines, such as for example 2,4- and 2,6-tolylenediamine, 3,5-diethyl-2,4- and/or -2,6-tolylenediamine, and primary ortho-, di-, tri- and/or tetra-alkyl-substituted 4,4'-diaminodiphenyl methanes.

To adjust the hardness and melting point of the TPU's, synthesis components (b) and (c) may be used in relatively broad molar ratios. Molar ratios of the polyhydroxyl compounds (b) to the chain-extending agents (c) of 1:1 to 1:12 and, more particularly, 1:1.8 to 1:4.4 have proved to be effective, the hardness and melting point of the TPU's increasing with increasing diol content.

To produce the TPU's, synthesis components (a), (b) and (c) are reacted, optionally in the presence of catalysts (d), in such quantities that the equivalent ratio of NCO groups of the diisocyanates to the sum of hydroxy groups or hydroxyl and amino groups of components (b) and (c) is 1:0.85 to 1.20, preferably 1:0.95 to 1:1.05 and, more preferably, approximately 1:1.02.

The reaction of components (a), (b) and (c) may be carried out in a single-stage reaction or via the stage of NCO prepolymers of relatively high molecular weight polyhydroxyl compounds (b) and excess diisocyanate (a) and further processing of the NCO prepolymers obtained with diisocyanate (a) and chain-extending agent (c).

Preferred catalysts (d), which are optionally used in the production of the TPU's and which, in particular, accelerate the reaction between the NCO groups of the diisocyanates (a) and the hydroxyl groups of the synthesis component (b) and (c), are the tertiary amines known from the prior art such as, for example, triethyl amine, dimethyl cyclohexyl amine, N-methyl morpholine, N,N'-dimethyl piperazine, 2-(dimethylaminoethoxy)-ethanol, diazabicyclo-( 2,2,2)-octane and the like and, in particular, organo-metallic compounds, such as titanic acid esters, iron compounds, tin compounds, for example tin diacetate, tin dioctoate, tin dilaurate, or the dialkyl tin salts of aliphatic carboxylic acids, such as dibutyl tin diacetate, dibutyl tin dilaurate or the like. The catalysts are typically used in quantities of 0.001 to 0.1 part per 100 parts polyhydroxyl compounds.

These thermoplastic polyurethanes must have a Shore D hardness of >50 and preferably in the range from 55 to 75.

Coupling agents are necessary in some cases because layers of ABS plastics and layers of the thermoplastic polyurethanes having Shore D hardness values of >50 do not adhere reliably to one another. Thermoplastic polyurethanes may also be used as the coupling agents. In that case, however, they must have a shore D hardness of <50 and preferably in the range from 45 D to 30 D. Examples of such coupling agents are polyadducts of 4,4'-diphenyl methane diisocyanate, a butylene glycol adipate and 1,4-butanediol as crosslinking agent and polyadducts of 4,4-diphenyl methane diisocyanate, a $C_4$ ether (polytetramethylene glycol) and 1,4-butanediol as crosslinking agent.

In a particularly preferred embodiment, the composite moldings according to the invention are sheet-form laminates of ABS and of TPU films. The ABS layers preferably have a thickness of 1 mm to 3 mm while the TPU layers have a thickness of 0.1 mm to 0.5 mm. The layer of coupling agent optionally applied between an ABS layer and a TPU layer is generally thinner and, for example, has a thickness of 0.02 mm to 0.2 mm.

The composite moldings according to the invention, more particularly the sheet-form laminates or composite films according to the invention may be produced as follows:

a) By multilayer co-extrusion using both multilayer nozzles and multilayer adaptors (black box system) and combinations of both.

b) Lamination of a TPU film or several TPU films onto ABS melt. The coupling agent may be applied to ABS, for example preferably by co-extrusion, or may already have been applied to the TPU film in a previous operation, for example preferably by co-extrusion.

c) The films (for example from 3b) may also be joined to the ABS substrate by heat lamination and/or flame lamination.

The layer sequence is preferably TPU/ABS or TPU/ABS/TPU (disregarding any layers of coupling agent which may be present).

Outstanding features of the composites according to the invention are their chemical stability, their ready processability by thermoforming and their ability to be joined to other layers. One example of their application is the production of refrigerator liners. The composite film according to the invention may first be brought into the required shape by thermoforming and then back-filled with polyurethane foam, the polyurethane foam being applied to the TPU side. A particularly firm bond is established between the foam and the surface which, of course, also consists of polyurethane. The corrosion of the ABS (stress cracking) often observed where ABS is directly coated with TPU foam is completely avoided.

EXAMPLES

The sheets were produced in a co-extrusion plant consisting of three extruders and a co-extrusion adaptor with a sheet die.

The ABS plastic used consisted of a styrene/acrylonitrile (SAN) copolymer (72% by weight styrene, 28% by weight acrylonitrile) having a molecular weight $M_w$ (weight average) of approx. 120,000 for a molecular non-uniformity $$\overline{M}_n/\overline{M}_w = -1 \leq 2$$

as matrix resin ($\overline{M}_n$=number average molecular weight, $\overline{M}_w$=weight average molecular weight) and a graft rubber consisting of 50 parts by weight polybutadiene having an average particle diameter ($d_{50}$) of 0.4 μm, onto which 36 parts by weight styrene and 14 parts by weight acrylonitrile were graft-polymerized. The mixing ratio of styrene/acrylonitrile copolymer to graft rubber (based on weight) is 60:40.

The coupling agent used was a TPU produced from 100 parts by weight polytetramethylene glycol (molecular weight 2000), 50 parts by weight 4,4-diphenyl methane diisocyanate and 9 parts by weight 1,4-butanediol as crosslinking agent.

A TPU produced from a mixture of 50 parts by weight polytetramethylene glycol (molecular weight 1000) and 50 parts by weight polytetramethylene glycol (molecular weight 2000), 141 parts by weight 4,4-diphenyl methane diisocyanate and 40 parts by weight 1,4-butanediol as crosslinking agent was applied as the outer layer.

The composite obtained had a total thickness of 2 mm, the TPU layer being 0.2 mm thick and the layer of coupling agent 0.05 mm thick. The width of the laminate was 700 mm.

FIG. 1 shows this composite material. The reference 1 denotes the ABS layer, the reference 2 denotes the layer of coupling agent and the reference 3 denotes the TPU layer.

After heating (approx. 180° C.), the laminate was thermoformed over a core to form a box-like container. The inside of the box was TPU.

TESTING OF THE MOLDINGS

1. Back-filling with PU foam

Figure 2:
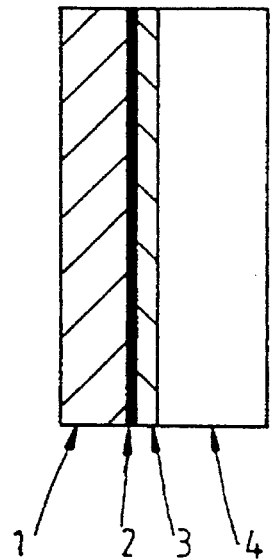
FIG. 2 illustrate an embodiment wherein the composite material of the invention is backed with polyurethane foam.

As usual in the refrigerator industry, the composite molding produced in this way was back-foamed with a polyurethane foam to form the composite shown in FIG. 2, in which the references 1 to 3 are as defined above and the reference 4 denotes the polyurethane layer.

Figure 3:
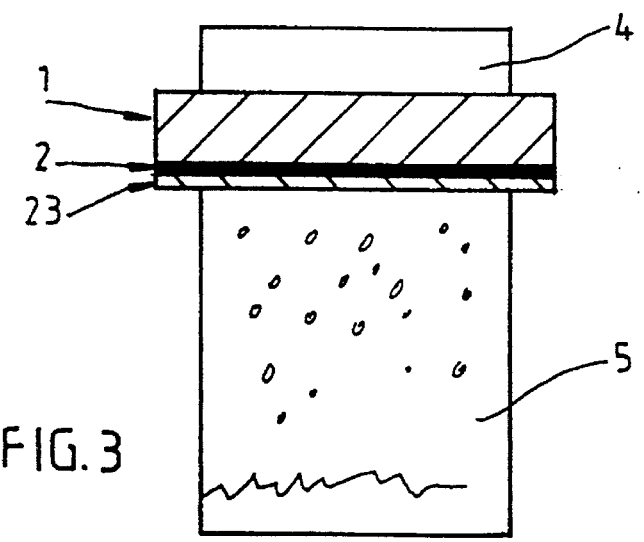
FIG. 3 illustrates the condensation of partially halogenated fluorocarbon onto the laminate of the invention.

2. The direct condensation of 1,1-dichloro-2,2,2-trifluoroethane onto the TPU side of the laminate is illustrated in FIG. 3. The references 1 to 3 are as defined above, the reference 6 denotes a layer of ice and the reference 5 denotes the condensed 1,2-dichloro-2,2,2-trifluoroethane.

The test was terminated after 5 hours. There was no sign of any damage to the surface.

In the same test, standard ABS shows stress cracks and blisters to the point of disintegration after only a few minutes.

We claim:

1. Composite moldings consisting of two adjacent layers, wherein:
   a) one layer consists of a graft polymer prepared by graft polymerization of styrene, acrylonitrile, methyl methacrylate or mixtures thereof onto polybutadiene rubber or polybutadiene/styrene copolymer rubber, and which graft polymer layer optionally further contains a thermoplastic resin copolymer of acrylonitrile and styrene, α-methyl styrene, or methyl methacrylate; and
   b) one layer consists of a thermoplastic polyurethane having a shore D hardness of >50, the layers optionally being joined by a coupling agent.

2. Composite moldings as claimed in claim 1 in the form of a composite film.

3. Composite moldings as claimed in claim 1, wherein a layer of coupling agent is present between the graft polymer layer and the thermoplastic polyurethane layer.

4. Composite moldings as claimed in claim 3 wherein the layer of coupling agent comprises a thermoplastic polyurethane having a Shore D hardness of <50.

5. Composite moldings as claimed in claim 3 in the form of a composite film.

6. A refrigerator liner comprising the composite of claims 1 coated on layer b) with polyurethane foam.

7. Composite moldings consisting of three adjacent layers, wherein:
   a) the middle layer consist of a graft polymer prepared by graft polymerization of styrene, acrylonitrile, methyl methacrylate or mixtures thereof onto polybutadiene rubber or polybutadiene/styrene copolymer rubber, and which graft polymer layer optionally further contains a thermoplastic resin copolymer of acrylonitrile and styrene, α-methyl styrene, or methyl methacrylate; and
   b) the first and third layers consist of a thermoplastic polyurethane having a shore D hardness of >50, wherein the first and third layers are optionally joined by a coupling agent to the middle layer.

* * * * *